(12) United States Patent  (10) Patent No.: US 8,441,692 B2
Maruyama  (45) Date of Patent: May 14, 2013

(54) IMAGE PROCESSING APPARATUS, IMAGE FORMING APPARATUS, IMAGE PROCESSING METHOD AND COMPUTER READABLE MEDIUM

(75) Inventor: Kosuke Maruyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 461 days.

(21) Appl. No.: 12/847,261

(22) Filed: Jul. 30, 2010

(65) Prior Publication Data

US 2011/0194151 A1    Aug. 11, 2011

(30) Foreign Application Priority Data

Feb. 9, 2010  (JP) ................................ P2010-026092

(51) Int. Cl.
  *H04N 1/407*  (2006.01)
  *G06K 15/00*  (2006.01)
  *G06K 9/40*   (2006.01)
  *G06F 3/12*   (2006.01)

(52) U.S. Cl.
  USPC .......................... 358/3.26; 358/3.13; 358/3.16

(58) Field of Classification Search .................. 358/1.13, 358/1.16, 3.26, 448; 382/260, 275
  See application file for complete search history.

(56) References Cited

U.S. PATENT DOCUMENTS 5,315,669 A *    5/1994  Kumagai ....................... 382/270
2012/0182586 A1 *  7/2012  Harayama ..................... 358/3.03

FOREIGN PATENT DOCUMENTS

| JP | A-8-272956   | 10/1996 |
| JP | B2-2733146   | 3/1998  |
| JP | A-11-284859  | 10/1999 |
| JP | A-2003-331260 | 11/2003 |

* cited by examiner

*Primary Examiner* — Jerome Grant, II
(74) *Attorney, Agent, or Firm* — Oliff & Berridge, PLC

(57) ABSTRACT

An image processing apparatus includes a binarization section, a determination section and an area setting section. The binarization section binarizes a given image. The determination section determines whether or not a pixel to be determined is effective in accordance with the number of pixels of one value of a binary value in each of determination areas. Each of the determination areas are placed so as not to contain the pixel to be determined in the binarized image and so as not to overlap in a predetermined direction of the pixel to be determined. The area setting section sets an area including the pixel determined effective in the determination section.

8 Claims, 18 Drawing Sheets

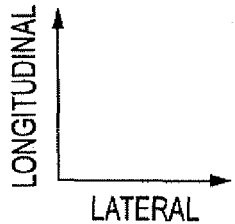

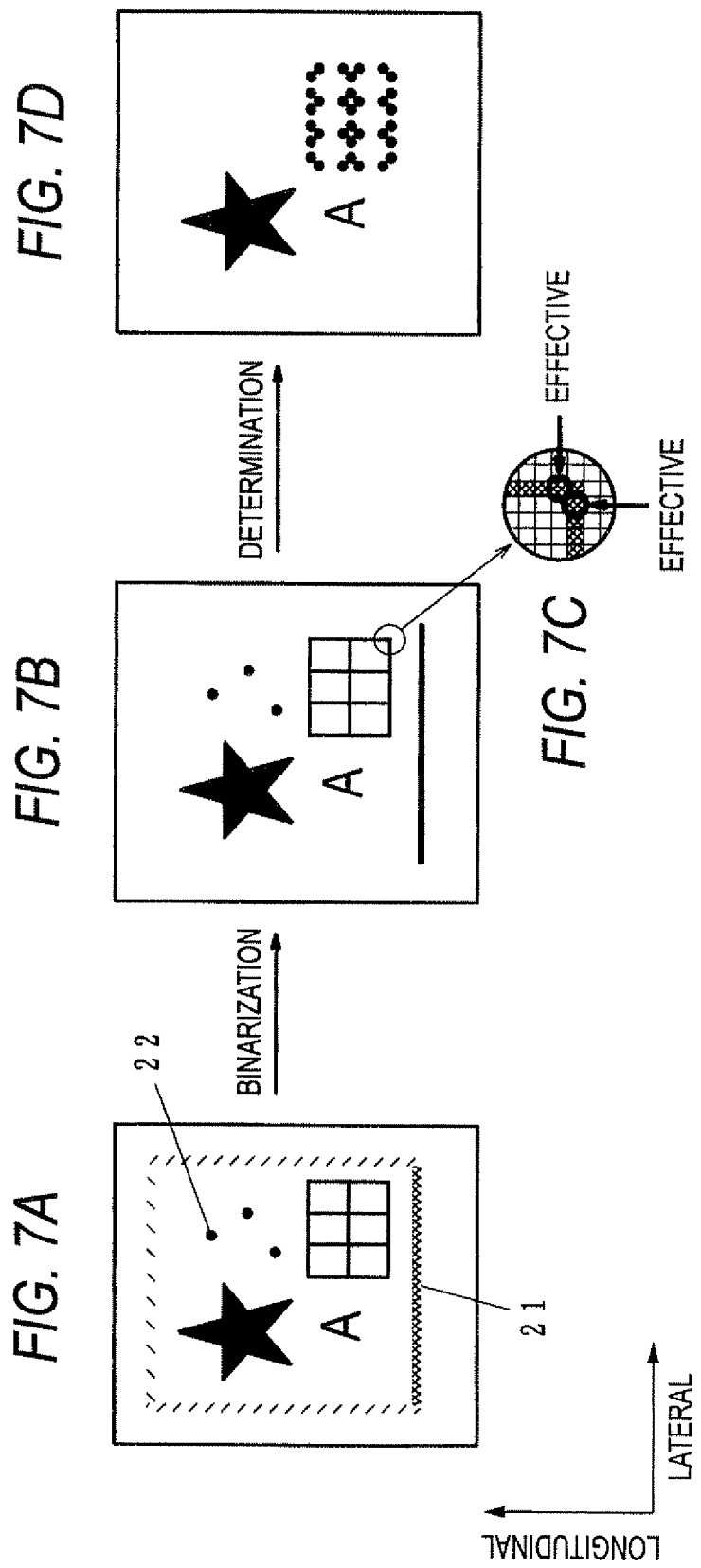

FIG. 8A

|   | a |   | b |   | c |   |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 1 | 1 | 0 | 0 |
| 0 | 0 | 0 | 1 | 1 | 0 | 0 |
| 0 | 0 | 0 | 0 | 0 | 0 | 0 |
| 0 | 0 | 0 | 0 | 0 | 0 | 0 | d — e  INEFFECTIVE f  g  h

FIG. 8B

|   | a |   | b |   | c |   |
|---|---|---|---|---|---|---|
| 1 | 0 | 0 | 0 | 0 | 0 | 0 |
| 1 | 0 | 0 | 0 | 0 | 0 | 0 |
| 1 | 0 | 0 | 0 | 0 | 0 | 0 |
| 1 | 0 | 0 | 1 | 1 | 0 | 0 |
| 1 | 0 | 0 | 1 | 1 | 0 | 0 |
| 1 | 0 | 0 | 0 | 0 | 0 | 0 |
| 1 | 0 | 0 | 0 | 0 | 0 | 0 | d — e  EFFECTIVE f  g  h

FIG. 9A
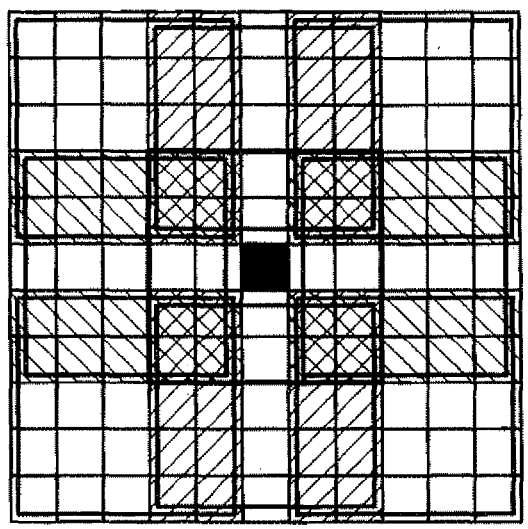
FIG. 9B
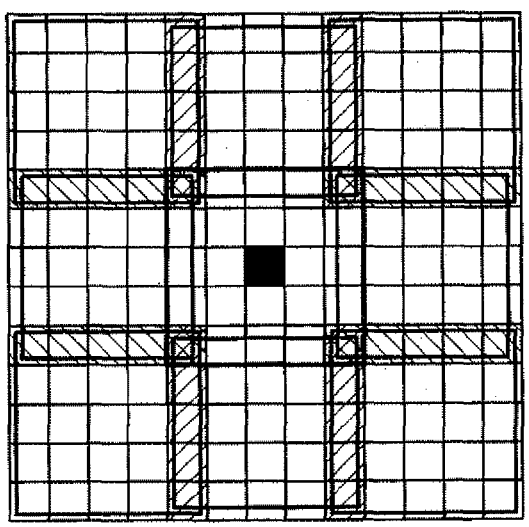
FIG. 9C
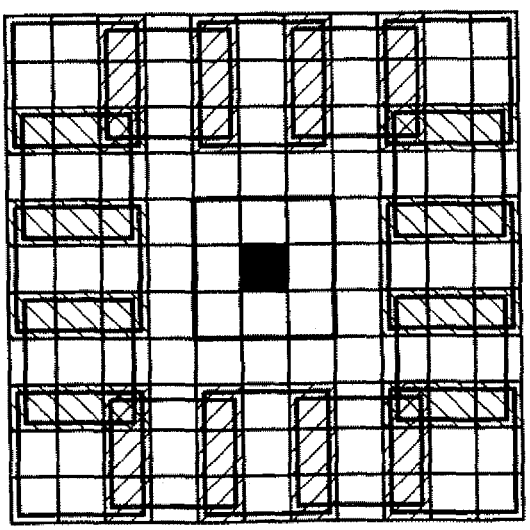
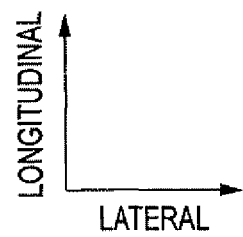

*FIG. 15A*  *FIG. 15B*  *FIG. 15C*  *FIG. 15D*
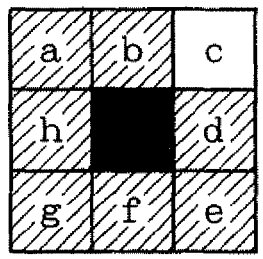 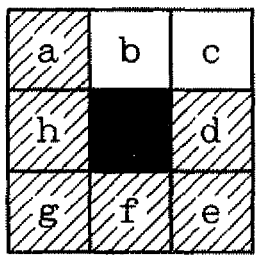 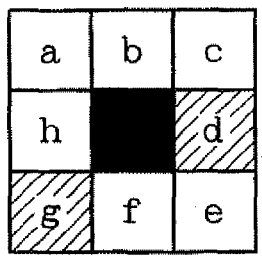 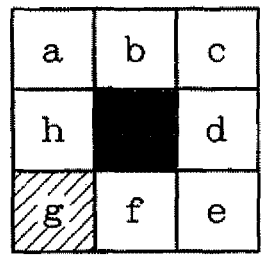
EFFECTIVE  TO DETERMINATION OF DETERMINATION SECTION  TO DETERMINATION OF DETERMINATION SECTION  INEFFECTIVE

IMAGE PROCESSING APPARATUS, IMAGE FORMING APPARATUS, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2010-026092 filed on Feb. 9, 2010.

BACKGROUND

Technical Field

This invention relates to an image processing apparatus, an image forming apparatus, an image processing method and a computer readable medium.

SUMMARY

According to an aspect of the invention, an image processing apparatus includes a binarization section, a determination section and an area setting section. The binarization section binarizes a given image. The determination section determines whether or not a pixel to be determined is effective in accordance with the number of pixels of one value of a binary value in each of determination areas. Each of the determination areas are placed so as not to contain the pixel to be determined in the binarized image and so as not to overlap in a predetermined direction of the pixel to be determined. The area setting section sets an area including the pixel determined effective in the determination section.

BRIEF DESCRIPTION OF THE DRAWINGS

Exemplary embodiment(s) of the present invention will be described in detail based on the following figures, wherein:

FIGS. 7A to 7D are schematic representations of a specific example of a given image;

FIGS. 8A and 8B are schematic representations of an example of determination for an isolated point;

FIGS. 9A to 9C are schematic representations of a second example of determination areas;

FIGS. 15A to 15D are schematic representations of specific examples of determination of the predetermination section;

DETAILED DESCRIPTION

Figure 1:
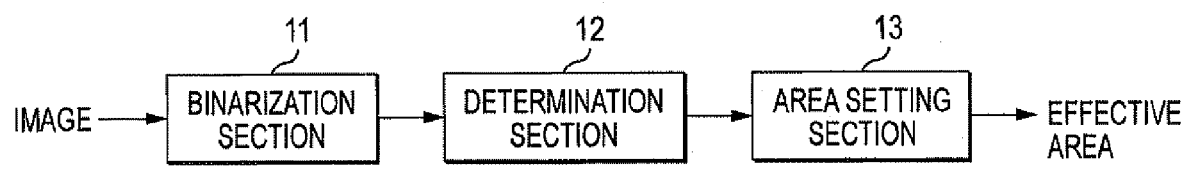
FIG. 1 is a configuration drawing to show one exemplary embodiment of the invention.

FIG. 1 is a configuration drawing to show one exemplary embodiment of the invention. In the figure, numeral 11 denotes a binarization section, numeral 12 denotes a determination section, and numeral 13 denotes an area setting section. The binarization section 11 binarizes a given image. A known art may be used as a binarization method.

The determination section 12 determines whether or not each pixel of an image binarized in the binarization section 11 is effective. In the determination, determination areas are placed at positions which become predetermined relationship with the pixel to be determined. The determination areas are placed so as to overlap another determination area and so as not to overlap in a predetermined direction of the pixel to be determined. The predetermined direction may be a direction in which a component unnecessary for setting an effective area described later extends linearly. For example, a straight line occurring on an image caused by a shadow occurring in an end part of a document exists as the unnecessary component extending linearly. Determination of each pixel to be determined is made in accordance with the number of pixels of one value of a binary value in each of the placed determination areas. For example, a comparison is made between the number of pixels of one value in an area of a predetermined size with the pixel to be determined as the center and the number of pixels of one value in the determination area. Based on the comparisons, the determination section 12 determines whether or not each determination area is effective, and whether or not the pixel to be determined is effective in accordance with the determinations to the determination areas.

The area setting section 13 sets an area including the pixels determined effective in the determination section 12 as an effective area. For example, the effective area may be a rectangular area and the coordinates of two points or four points of the corners of the rectangle may be set.

Figure 2:
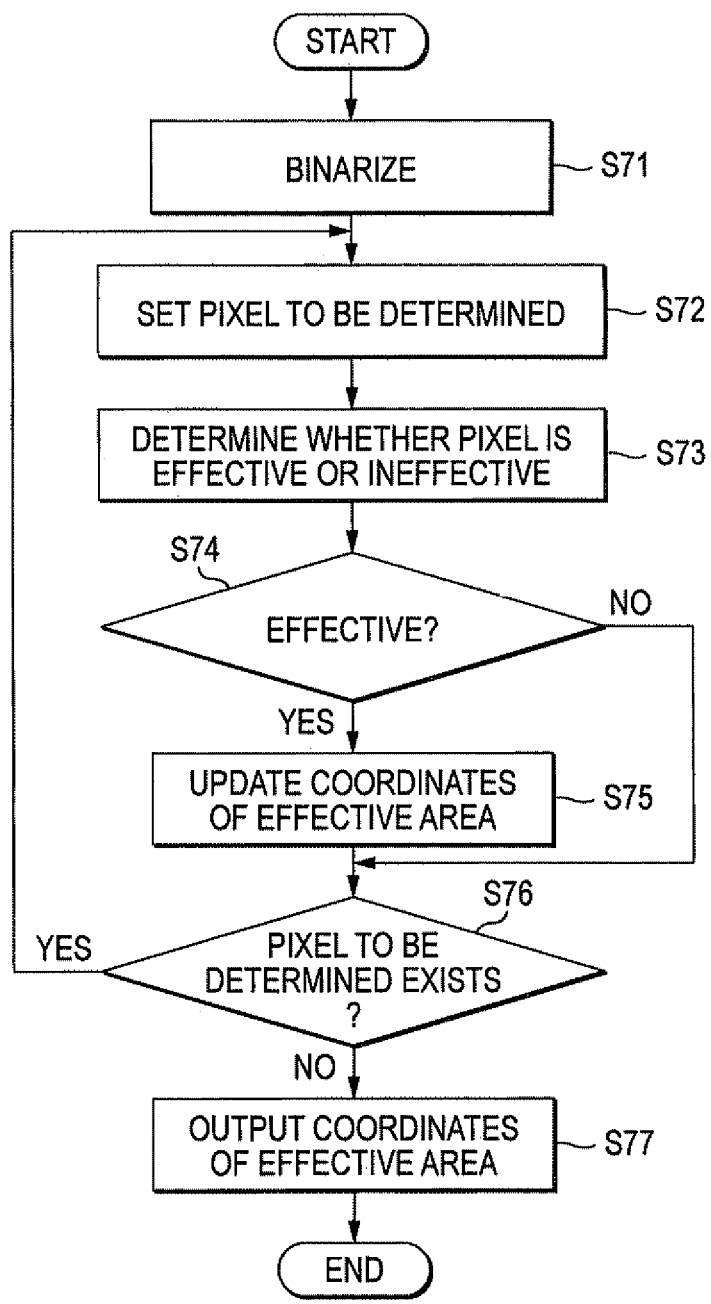
FIG. 2 is a flowchart to show an example of the operation in the exemplary embodiment of the invention.

FIG. 2 is a flowchart to show an example of the operation in the exemplary embodiment of the invention. First, at S71, the binarization section 11 binarizes a given image.

At S72, the determination section 12 sets the pixels to be determined in order from the binarized image. At S73, the determination section 12 determines whether or not each pixel to be determined, set at S72 is effective. An example of a determination method is described later. At S74, whether or not the pixel to be determined is determined effective is determined. If the pixel is determined effective, at S75, the area setting section 13 updates the effective area according to the position of the pixel determined effective.

At S76, whether or not the pixel to be determined remains is determined. If the pixel to be determined exists, the process returns to S72 and determination processing is performed for the pixel. If the pixel to be determined does not remain, at S77, information of the coordinates indicating the effective area, etc., is output and the processing is terminated.

Figure 3:
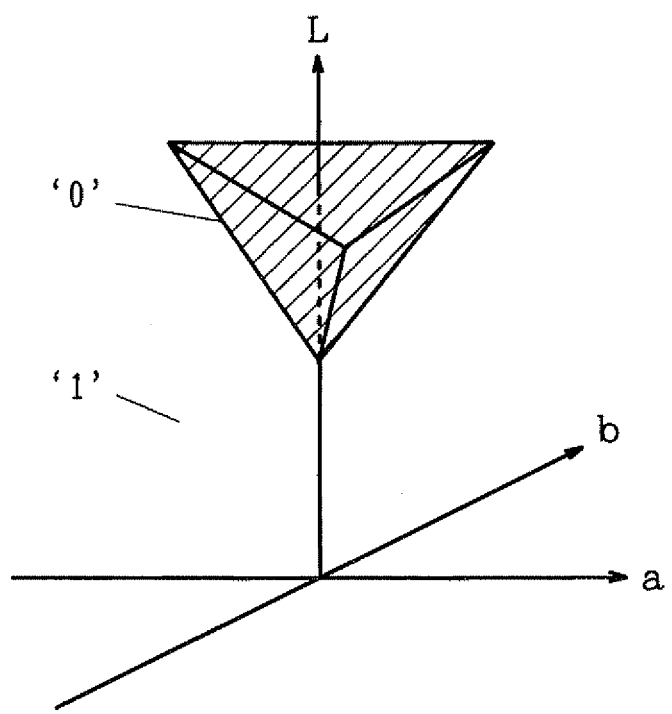
FIG. 3 is a schematic representation of an example of binarization.

The configuration and the operation described above will be further discussed. First, an example of binarization processing performed by the binarization section 11 at S71 in FIG. 2 is shown. FIG. 3 is a schematic representation of an example of binarization. FIG. 3 shows an example of binarization when a color image is given. In the example, a three-dimensional threshold value determined from a previously given image is used and different values are given to a color area hatched in the figure in a color space and any other area for binarization. For example, '0' is given to the pixels of color in the hatched color area and '1' is given to any other area. The method is not limited to the illustrated binarization method and a known binarization method may be used; for example, if the given image is a monochrome image, a binarization method using a fixed threshold value or a floating threshold value is used, etc.

An example of the determination processing performed by the determination section 12 at S73 in FIG. 2 will be discussed. To determine whether or not the pixel to be determined is effective, the determination section 12 places determination areas at positions which become predetermined relationship with the pixel to be determined. FIGS. 4A to 4I are schematic representations of a first example of the determination areas. The black rectangle in the figure is the pixel to be determined and each area surrounded by the thick line is the determination area. In the example, the size of the determination area is 3×3 pixels and eight determination areas of FIGS. 4A to 4H are placed. As shown in FIG. 4I, each determination area overlaps any other determination area; for example, the determination area shown in FIG. 4A overlaps the determination areas shown in FIGS. 4B and 4D. In the example, overlap of the determination areas does not exist in the lateral or longitudinal direction of the pixel to be determined because the example deals with the case where a shadow occurring in an end part of a document extends in the lateral or longitudinal direction.

Figure 5:
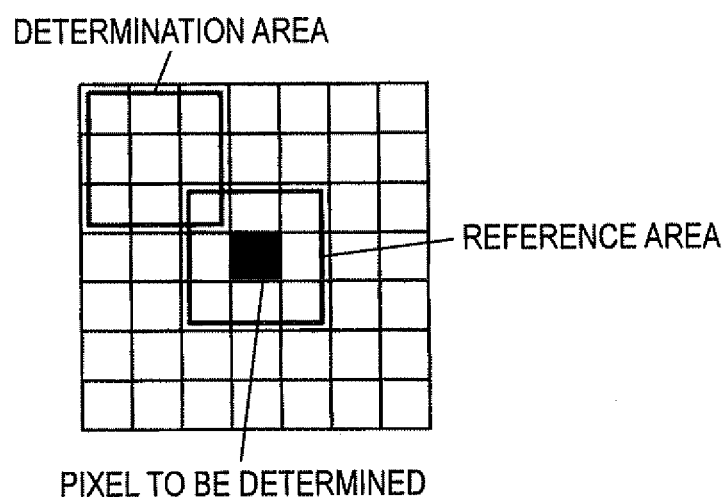
FIG. 5 is a schematic representation of an example of effective determination of the determination area.

The determination section 12 determines whether or not each of the determination areas is effective. FIG. 5 is a schematic representation of an example of effective determination of the determination area. As a method of determining whether or not the determination area is effective, here the number of pixels of one value in an area of a predetermined size with the pixel to be determined as the center is used. In the example, the area of the size of 3×3 pixels with the pixel to be determined as the center may be set as a reference area. For example, the number of pixels of value '1' of binary value in the reference area, S, and the number of pixels of the determination area, T, are counted, and whether or not T>S–α may be determined. If the condition is satisfied, the determination area is effective; if the condition is not satisfied, the determination area is ineffective. Here, α is a preset value and is a setup value used so as to prevent an isolated point from being erroneously determined effective.

Figure 4A:
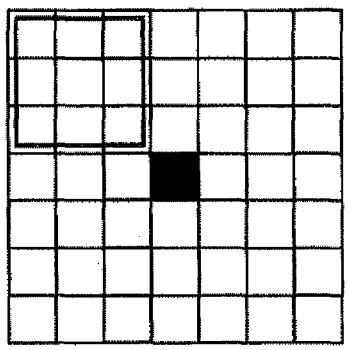
FIGS. 4A to 4I are schematic representations of a first example of determination areas.
Figure 4B:
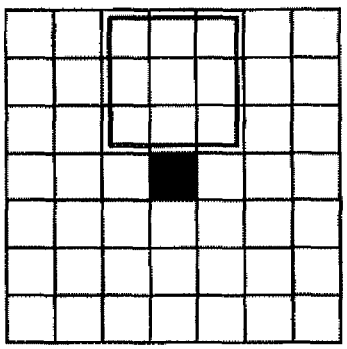
Figure 4C:
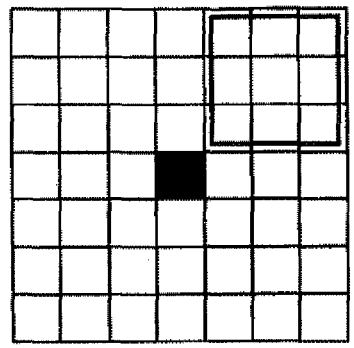
Figure 4D:
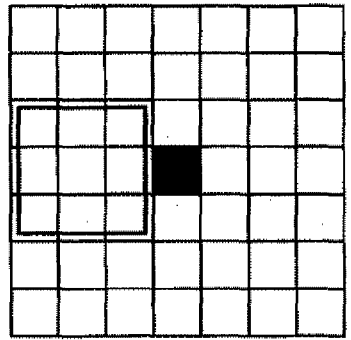
Figure 4I:
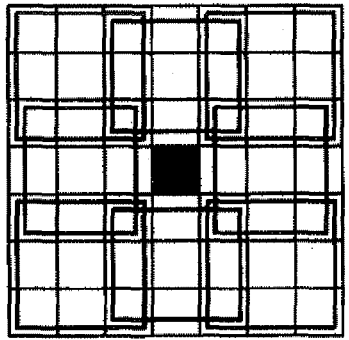
Figure 4E:
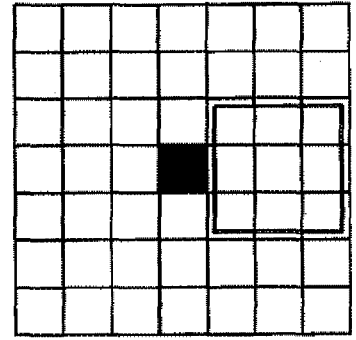
Figure 4F:
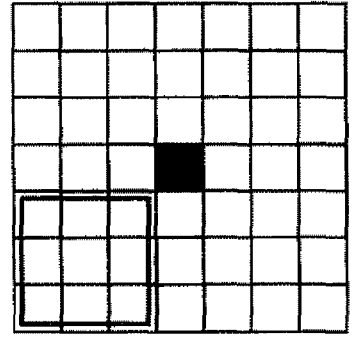
Figure 4G:
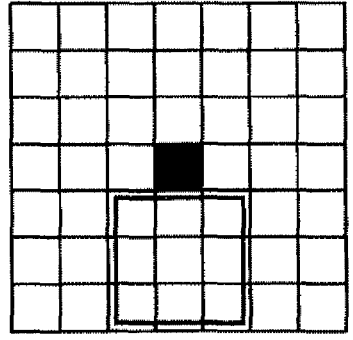
Figure 4H:
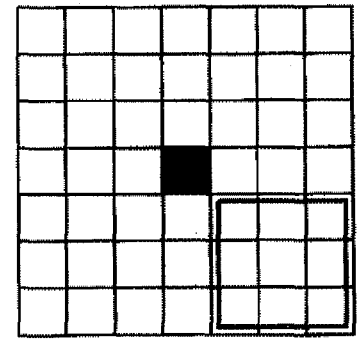

FIG. 5 shows the relationship of the determination area shown in FIG. 4A with the reference area; whether or not other determination areas are effective are also determined by referencing the reference area shown in FIG. 5. When whether or not each determination area is effective is determined, whether or not the number of determination areas determined effective is equal to or more than a preset value is determined. If the number of effective determination areas is equal to or more than the preset value, the pixel to be determined is determined effective. If the number of effective determination areas is smaller than the preset value, the pixel to be determined is determined ineffective. If the pixel to be determined is not a significant pixel, for example, is a pixel of '0' of binary value, the pixel may be determined ineffective without performing the condition determination described above.

Figure 6A:
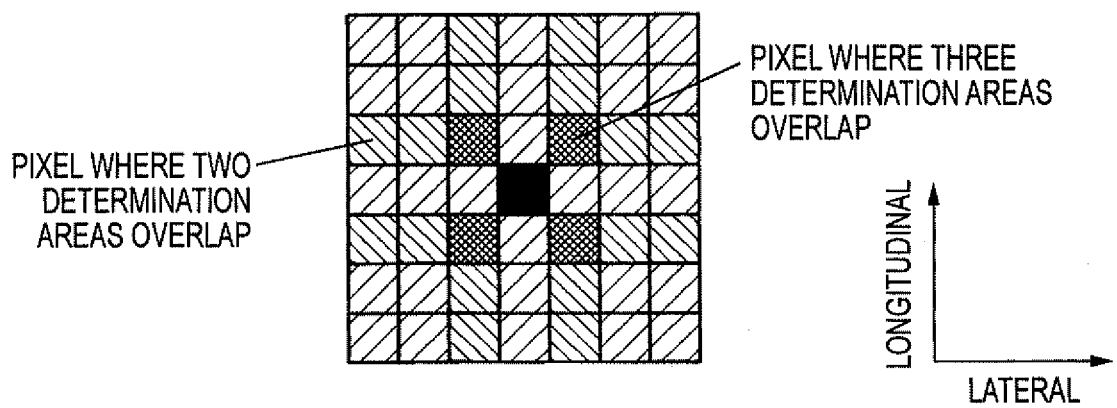
FIGS. 6A to 6C are schematic representations of an example of the relationship among the determination areas.
Figure 6B:
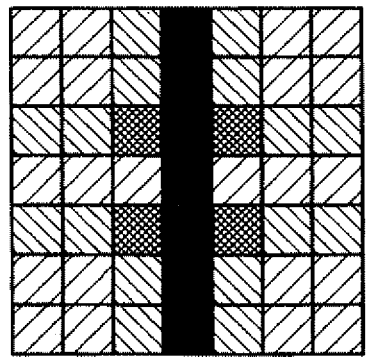
Figure 6C:
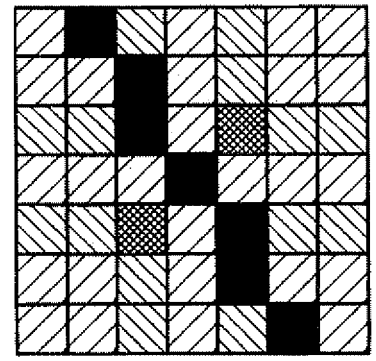

FIGS. 6A to 6C are schematic representations of an example of the relationship among the determination areas. If the eight determination areas shown in FIGS. 4A to 4H are put on each other, pixels where two determination areas overlap and pixels where three determination areas overlap exist as shown in FIGS. 6A to 6C. The areas are hatched in different manners in response to the number of overlap determination areas in FIGS. 6A to 6C. The pixel where the determination areas overlap is used in determining whether or not each of the overlap determination areas is effective and thus the pixel is used more than once and has an effect on the final determination result. In the example, the determination areas are set so that the pixel where the determination areas overlap does not exist in the longitudinal or lateral direction of the pixel to be determined. Thus, the effect of the pixels in the longitudinal direction and the lateral direction on the final determination result for the pixel to be determined becomes small as compared with the effect of the pixels where the determination areas overlap.

For example, the line in the longitudinal direction as shown in black in FIG. 6B passes through the two determination areas and thus these two determination areas may become effective. In contrast, the slanting line as shown in black in FIG. 6C passes through the six determination areas and these six determination areas may become effective. Therefore, the slanting line tends to be determined effective as compared with the line in the longitudinal or lateral direction.

FIGS. 7A to 7D are schematic representations of a specific example of a given image. In the figure, numeral 21 denotes a shadow of a document and numeral 22 denotes noise. In an example of the image shown in FIG. 7A, a portion outside the document is contained together with the image of the document. A shadow occurs in end parts of the document and is indicated by slashes. The shadow differs in density depending on the sides of the document. The document is placed so that the end parts of the document become the lateral direction and the longitudinal direction for the whole image.

FIG. 7B shows an image provided by binarizing the image shown in FIG. 7A. A shadow occurring on one side in the end parts of the document remains as a straight line in the lateral direction by binarization processing of the binarization section 11. However, the end parts of the document become the lateral direction and the longitudinal direction as described above and in the example, the lines in the longitudinal direction and the lateral direction are determined ineffective and thus the pixels making up the straight line caused by the shadow occurring in the end parts of the document are determined ineffective. FIG. 7D shows the pixels determined effective in black and the pixels determined ineffective in white. Thus, the straight line caused by the shadow occurring in the end parts of the document is determined ineffective and is not reflected on FIG. 7D.

Noise 22 is contained in the image shown in FIG. 7A. Here, the noise 22 remains still after binarization of the binarization section 11. However, the noise 22 is determined ineffective by the determination section 12. Thus, it is not reflected on FIG. 7D indicating the determination result.

Ruled lines of a table are contained in the example of the image shown in FIGS. 7A and 7B. If a line in the direction in which an end part of a document extends is used as the ruled line of a table, the portion of the line segment is determined ineffective as described above. However, a corner and a portion where ruled lines cross shown in FIG. 7C are determined effective in the pixels indicated by arrows. Thus, the area surrounded by ruled lines is not excluded from an effective area. A character is made up of a straight line, an intersection point, a curve, and a corner. Therefore, slanting lines of the curve and the straight line are determined effective and as described in the ruled lines, effective pixels also remain in the intersection point and the curve and thus they are not excluded from effective areas.

As the method of determining whether or not each determination area is effective, the number of pixels of 1 in the reference area, S, and the number of pixels of '1' in the determination area, T are counted and whether or not T>S−α is determined by way of example. This determination makes an isolated point ineffective according to the relationship with the surrounding of the pixel to be determined. FIGS. 8A and 8B are schematic representations of an example of determination for an isolated point. In FIGS. 8A and 8B, the binarized value of each pixel is indicated by '0' or '1' and a reference area is surrounded by a thick line and each determination area is surrounded by a thin line.

In the example shown in FIG. 8A, the number of pixels of '1' is four in the reference area, is 0 in determination areas a, b, c, d, and f, is two in determination areas e and g, and is one in determination area h. For example, assuming that α=2, a determination area where T>S−2 does not exist. Therefore, the pixel to be determined is determined ineffective. This example is an example of an isolated point and the area is excluded from effective areas.

On the other hand, an example shown in FIG. 8B shows an example wherein it is considered that cut occurs because of a light brush-stroke, etc. The number of pixels of '1' is four in the reference area, is three in determination areas a, d, and f, is 0 in determination areas b and c, is two in determination areas e and g, and is one in determination area h. For example, assuming that α=2, three determination areas where T>S−2 exist. If the pixel to be determined is determined effective when the number of determination areas determined effective is three or more, the pixel to be determined is determined effective in the example. In the example, the pixel to be determined is an isolated point, but is determined effective from the relationship with the surrounding.

Of course, the determination method is not limited to the example. Various methods of making a direct comparison between the number of pixels of '1' in the reference area and that in the determination area, for example, as α=0, making a comparison between the number of pixels of '1' in the determination area and a fixed value, etc., are also possible.

The determination areas shown in FIGS. 4A to 4I are an example and determination areas are not limited to them. Some examples are shown below: FIGS. 9A to 9C are schematic representations of a second example of determination areas. In examples shown in FIGS. 9A and 9B, the size of each determination area is 5×5 pixels. In the example shown in FIG. 9A, overlap of adjacent determination areas is two pixels. In the example shown in FIG. 9B, overlap of adjacent determination areas is one pixel. Further, FIG. 9C shows an example wherein 16 determination areas each having the size of 3×3 pixels are placed. In the example, overlap of determination areas is not provided in the longitudinal or lateral direction of the pixel to be determined.

Thus, the size of the determination area and the number of determination areas may be previously determined and at least the determination areas may overlap and may be placed so that the overlap does not exist in the longitudinal or lateral direction of the pixel to be determined. The value used as a threshold value in determining effectiveness of the pixel to be determined from the number of determination areas determined effective may also be set in response to the number of determination areas.

The size of the reference area with the pixel to be determined as the center may be the size of the determination area or may differ from the size of the determination area. The difference in the number of pixels in the areas may be absorbed by adjusting the value α in determination, for example.

Figure 10:
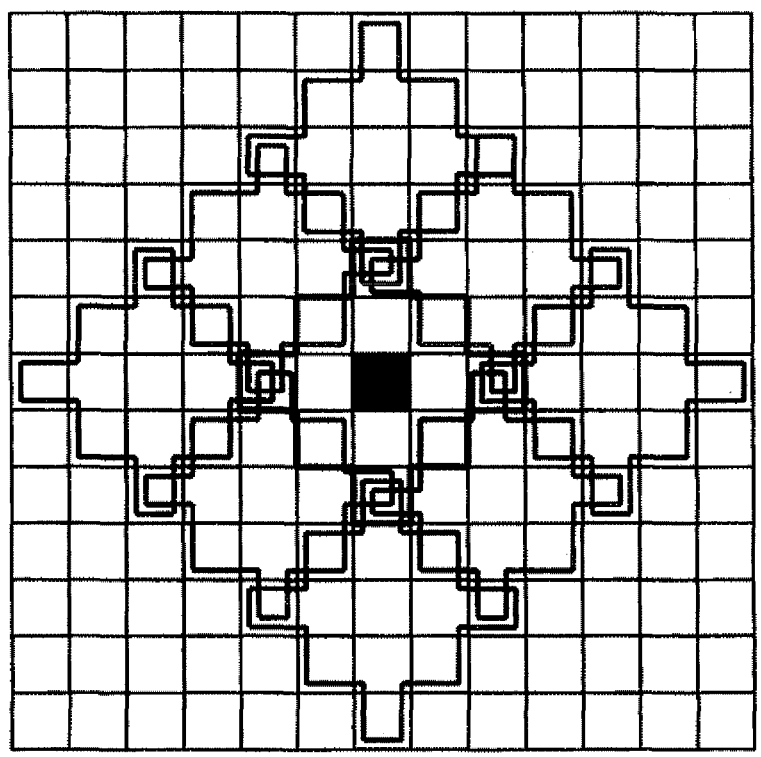
FIG. 10 is a schematic representation of a third example of determination areas.

The method of the determination area described above shows the example wherein a document is placed so that the end parts of the document become the longitudinal and lateral directions relative to an image. For example, if it is known that a document is placed slantingly, the determination area may be placed so as not to overlap the extension direction of a shadow occurring in the end part of the document. FIG. 10 is a schematic representation of a third example of determination areas. In the example shown in FIG. 10, determination areas are placed so as not to overlap relative to a direction of 45 degrees. For example, if inclination is previously known, determination areas may be placed so as not to overlap relative to the direction responsive to the inclination. Alternatively, the inclination of a straight line in an image may be detected and placement of determination areas may be switched in determination processing so that the determination areas do not overlap relative to the direction responsive to the inclination.

Figure 11A:
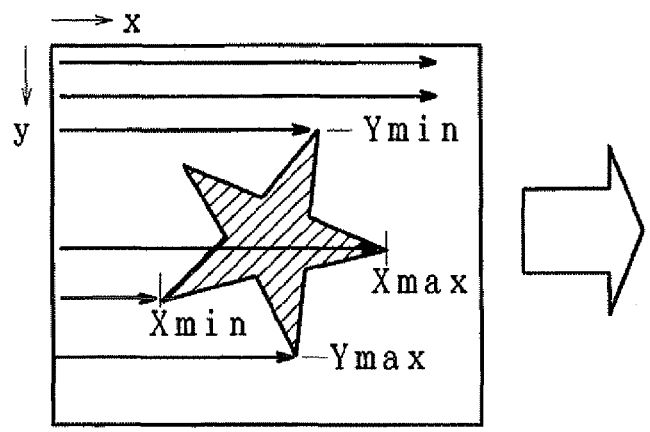
FIGS. 11A and 11B are schematic representations of an example of setting of an effective area by an area setting section 13.
Figure 11B:
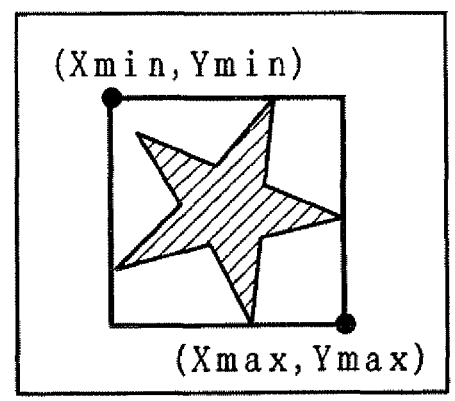

FIGS. 11A and 11B are schematic representations of an example of setting of an effective area by the area setting section 13. An example of a setting method of an effective area by the area setting section 13 at S75 in FIG. 2 is shown. For example, the effective area is a rectangle area and two-point coordinates (Xmin, Ymin) and (Xmax, Ymax) of corners of the rectangle are set. To set the coordinates, when the determination section 12 determines that the pixel to be determined is effective, the coordinates of the effective area may be updated while a comparison is made between the coordinates of the pixel to be determined and the coordinates (Xmin, Ymin) and the coordinates (Xmax, Ymax). Letting the coordinates of the pixel determined effective be (x, y), if x<Xmin, Xmin is updated as Xmin=x; if x>Xmax, Xmax is updated as Xmax=x; if y<Ymin, Ymin is updated as Ymin=y; and if y>Ymax, Ymax is updated as Ymax=y. If Xmin≦x≦Xmax or Ymin≦y≦Ymax, no update is executed.

In FIGS. 11A and 11B, the pixel in the hatched portion is the pixel determined effective. In this case, Xmin, Ymin, Xmax, and Ymax are determined in the pixel shown in FIG. 11A. The effective area indicated by the thick line is set according to the coordinate values.

The method of setting the effective area from the effective pixel by the area setting section 13 is not limited to the method and various known methods may be applied. The shape of the effective area is not limited to the rectangle. The effective area obtained from the effective pixel may be processed for output in such a manner that the effective area is set considering an error, etc.

Figure 12:
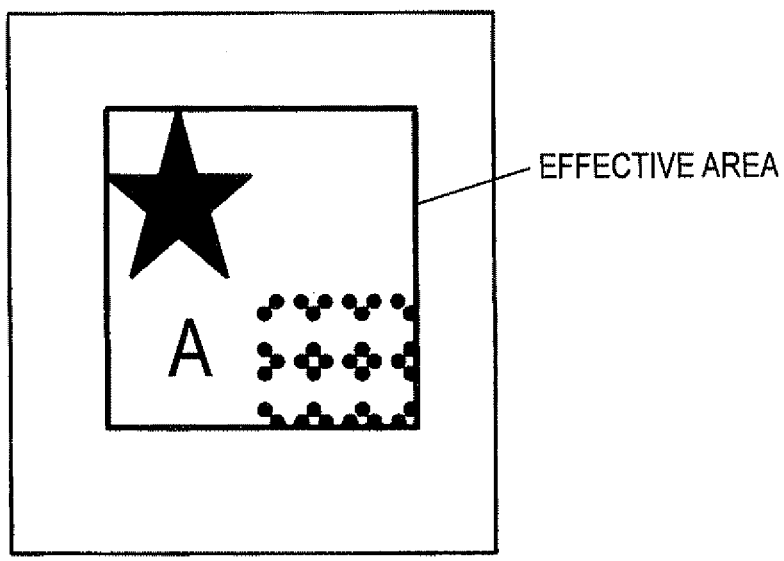
FIG. 12 is a schematic representation of a specific example of a setup effective area.

FIG. 12 is a schematic representation of a specific example of a setup effective area. An example of an effective area set by the area setting section 13 when the image shown in FIG. 7A is given is indicated by the thick line. As described above, the shadow 21 of the document contained in the given image is determined ineffective by the determination section 12 and thus is not contained in the effective area. Thus, a margin portion provided when the document is created is excluded and the portion of the contents essentially required is set as the effective area. The noise 22 is also determined ineffective by the determination section 12 and thus is not contained in the effective area. Containing an unnecessary portion in the effective area because of the effect of noise is avoided.

Figure 13:
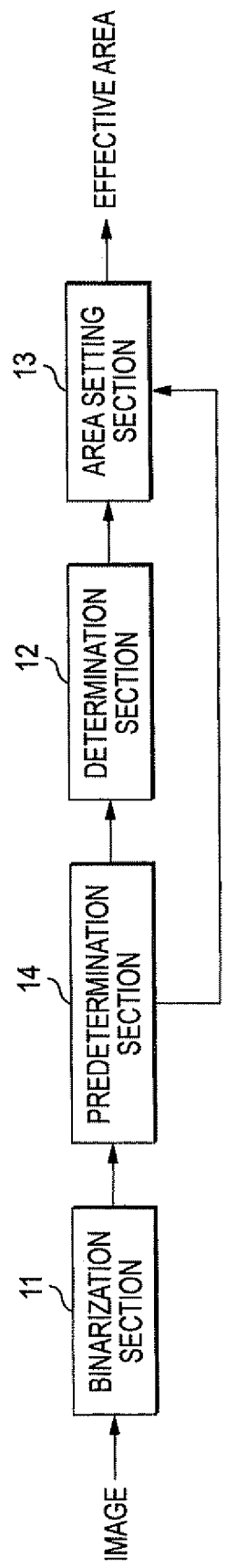
FIG. 13 is a configuration drawing to show a first modified example in the exemplary embodiment of the invention.

FIG. 13 is a configuration drawing to show a first modified example in the exemplary embodiment of the invention. In the figure, numeral 14 denotes a predetermination section. The predetermination section 14 determines a pixel effective if said pixel has the one value and if the number of pixels of the one value in a predetermined range from said pixel is larger than a predetermined first value. The predetermination section 14 determines a pixel ineffective if said pixel has the one value, and if the number of pixels of the one value in a predetermined range from said pixel is equal to or less than a predetermined second value being smaller than the predetermined first value or the pixel. And, the predetermination section 14 determines a pixel ineffective if said pixel does not have the one value. If a pixel has the one value of a binary value and the number of pixels of the one value in a predetermined range from said pixel is smaller than the first value and is larger than the second value, the determination section 12 determines whether or not said pixel is effective.

Figure 14:
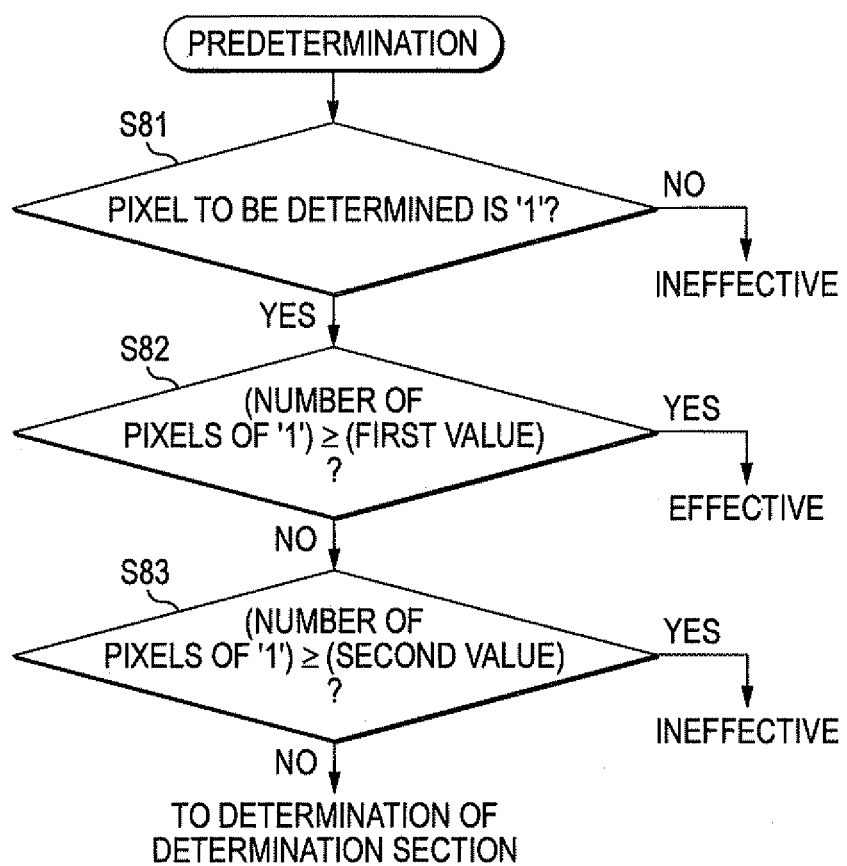
FIG. 14 is a schematic representation of an example of determination processing in a predetermination section.

FIG. 14 is a schematic representation of an example of determination processing in the predetermination section. Here, it is assumed that one value of a binary value is '1.' First, at S81, whether or not the pixel to be determined is is determined. If the pixel to be determined is '0,' the pixel is determined ineffective. In this case, the determination section 12 does not make determination.

If the pixel to be determined is '1', at S82, a comparison is made between the number of pixels of '1' in the predetermined range other than the pixel to be determined and the first value. If the number of pixels of '1' is equal to or more than the first value, the pixel to be determined is determined effective.

If the number of pixels of '1' is less than the first value, further at S83, a comparison is made between the number of pixels of '1' in the predetermined range other than the pixel to be determined and the second value. The second value is a smaller value than the first value. If the number of pixels of '1' is equal to or less than the second value, the pixel to be determined is determined ineffective.

If the number of pixels of '1' is larger than the second value, namely, is less than the first value and is larger than the second value, the determination section 12 determines whether or not the pixel to be determined is effective. The determination section 12 does not make determination as to the pixel to be determined, determined effective or ineffective in the predetermination section 14.

FIGS. 15A to 15D are schematic representations of specific examples of determination of the predetermination section. FIGS. 15A to 15D shows 3×3 pixels with the pixel to be determined, filled in black as the center, and the pixels of '1' of the eight pixels other than the pixel to be determined are hatched. In the description of the examples, the first value is 7 and the second value is 1. First, if the pixel to be determined is '0,' the pixel is determined ineffective.

In the examples shown in FIGS. 15A to 15D, the pixel to be determined is '1.' In the example shown in FIG. 15A, seven pixels of a, b, d, e, f, g, and h are '1.' In this case, the number of pixels of '1' is equal to more than 7 of the first value, the pixel to be determined is determined effective. In this case, it is determined that the pixel is inside a drawing pattern and the pixel to be determined is determined effective In the example shown in FIG. 15B, six pixels of a, d, e, f, g, and h are '1' and the number of pixels of '1' is less than 7 of the first value. Further, the number of pixels of is larger than 1 of the second value and thus the determination section 12 determines whether or not the pixel to be determined is effective. In the example shown in FIG. 15C, two pixels of d and g are '1' and thus the number of pixels of '1' is less than 7 of the first value and is larger 1 of the second value. Therefore, the determination section 12 determines whether or not the pixel to be determined is effective.

In the example shown in FIG. 15D, the pixel of g is '1.' In this case, the number of pixels of '1' is equal to or less than 1 of the second value and thus the pixel to be determined is determined effective. In this case, the pixel to be determined is determined an isolated point of noise, etc., and thus is determined ineffective.

Thus, when the pixel to be determined is obviously determined effective or ineffective, the predetermination section 14 makes determination and in other cases, the determination section 12 determines whether or not the pixel to be determined is effective. Therefore, in the first modified example, the determination section 12 determines whether or not the pixel not determined effective or ineffective is effective. Since the number of pixels determined by the determination section 12 decreases, processing is speeded up as compared with the case where the predetermination section 14 is not provided. The area setting section 13 sets an area including pixels determined effective in the predetermination section 14 or the determination section 12.

In the description given above, the pixels in the predetermined range from the pixel to be determined are the eight pixels of the area of the 3×3 pixels containing the pixel to be determined, but the number of pixels is not limited to it; predetermination may be made by changing the reference range in such a manner that the number of pixels is four pixels adjacent to the pixel to be determined or 24 pixels of an area of 5×5 pixels, needless to say.

Figure 16:
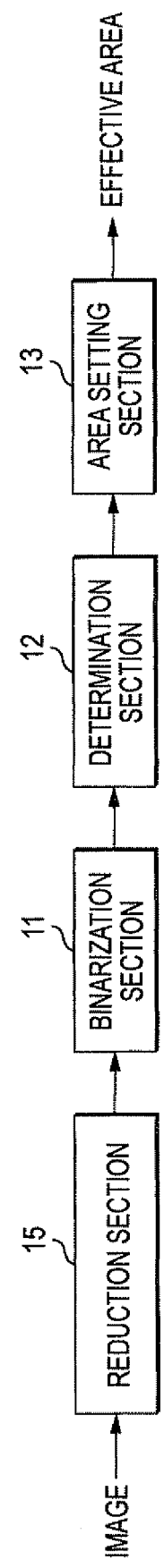
FIG. 16 is a configuration drawing to show a second modified example in the exemplary embodiment of the invention.

FIG. 16 is a configuration drawing to show a second modified example in the exemplary embodiment of the invention. In the figure, numeral 15 denotes a reduction section. The reduction section 15 reduces a given image. As a reduction method, a known technique may be used. The reduction section 15 reduces the given image, the number of pixels to be processed decreases in processing on an after the binarization section 11 as compared with the case where the image is not reduced.

In the configuration example shown in FIG. 16, the reduction section 15 is provided in the configuration shown in FIG. 1, but may be provided in the configuration of the first modified example shown in FIG. 13, namely, in the configuration having the predetermination section 14.

Figure 17:
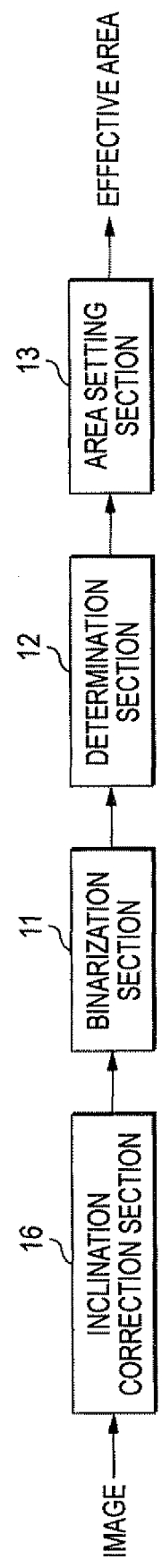
FIG. 17 is a configuration drawing to show a third modified example in the exemplary embodiment of the invention

FIG. 17 is a configuration drawing to show a third modified example in the exemplary embodiment of the invention. In the figure, numeral 16 denotes an inclination correction section. The inclination correction section 16 corrects inclination of a given image. As a technique of correcting inclination, a known technique may be used. For example, when a document is read through a reader, if the document is inclined, a shadow occurring in an end part of the document in a given image is inclined relative to the image. The inclination correction section 16 corrects the image, whereby a straight line caused by the shadow in the end part of the document is corrected in longitudinal direction or the lateral direction. Accordingly, if placement of the determination area used in determination of the determination section 12 is fixed for use, an effective area from which the straight line caused by the shadow occurring in the end part of the document is excluded is set.

In the configuration example shown in FIG. 17, the inclination correction section 16 is provided in the configuration shown in FIG. 1, but may be provided in the configuration having the predetermination section 14 shown in FIG. 13, the configuration having the reduction section 15 shown in the second configuration in FIG. 16, or the configuration having both the predetermination section 14 and the reduction section 15.

Figure 18:
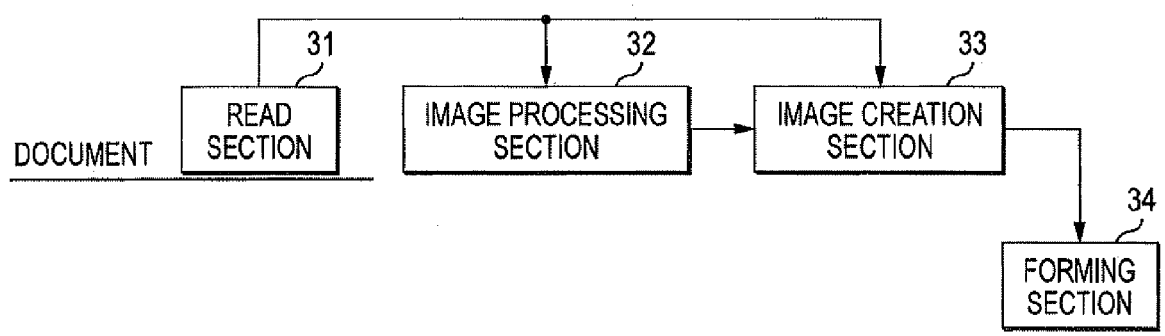
FIG. 18 is a configuration example to show one exemplary embodiment of an image forming apparatus of the invention.

FIG. 18 is a configuration example to show one exemplary embodiment of an image forming apparatus of the invention. In the figure, numeral 31 denotes a read section, numeral 32 denotes an image processing section, numeral 33 denotes an image creation section, and numeral 34 denotes a forming section. The read section 31 reads an image drawn on a document. To read the image, the portion outside the document may be contained in reading. As a read method, a known configuration may be applied.

The image processing section 32 is described above as the exemplary embodiment of the image processing apparatus of the invention and its modified example. It receives an image read through the read section 31, sets an effective area, and passes information of the effective area to the image creation section 33.

The image creation section 33 cuts out an effective area based on the information of the effective area passed from the image processing section 32 from the image read in the read section 31 and creates an image formed in the forming section 34. For example, the image creation section 33 may perform scale-up, scale-down processing, etc., in response to the size of a medium used in the forming section 34. Alternatively, the image creation section 33 may specify a medium of the size responsive to the size of the cut out image and may command the forming section 34 to form an image.

The forming section 34 forms the image created in the image creation section 33 on a medium.

Figure 19:
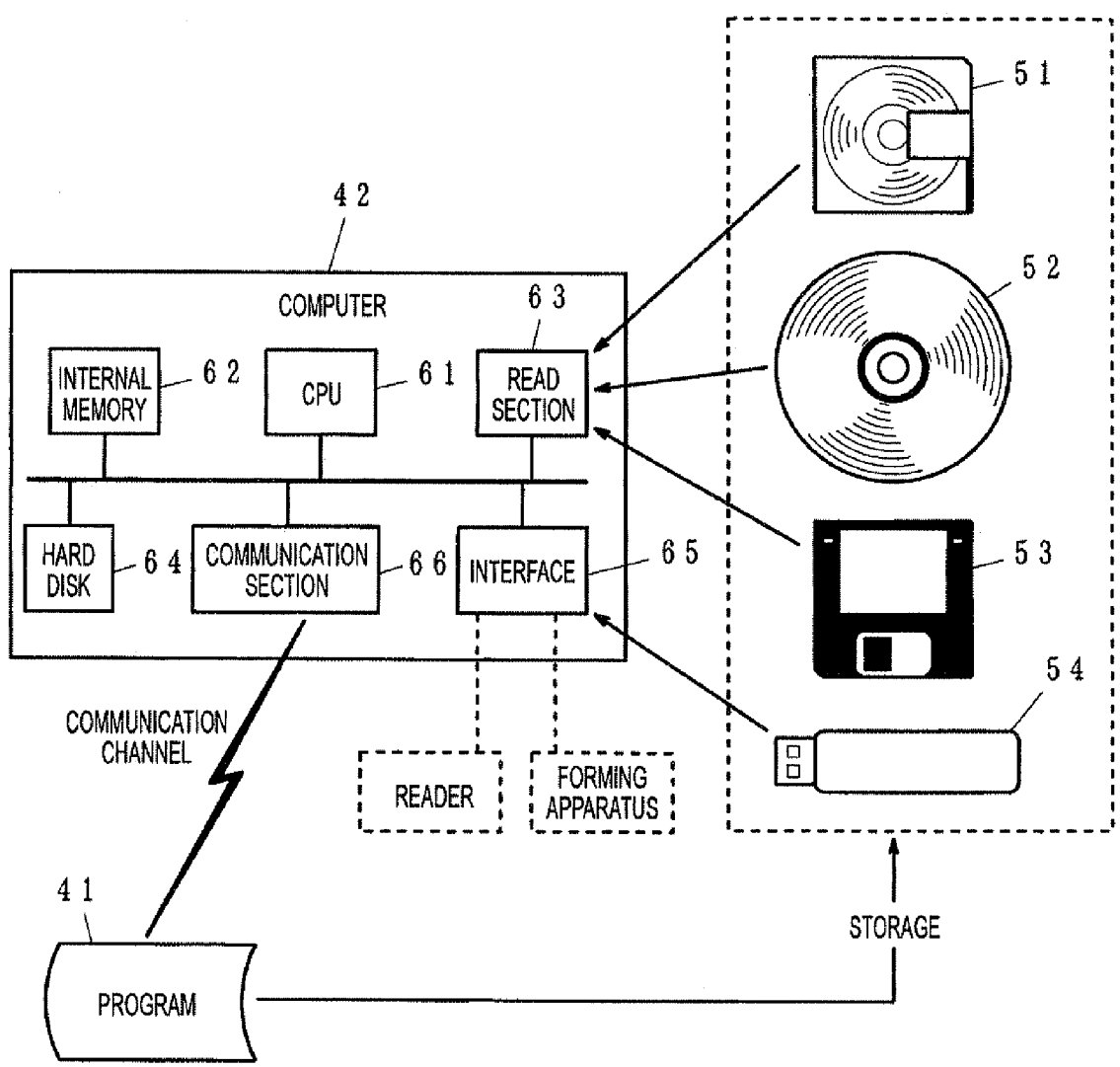
FIG. 19 is a schematic representation of examples of a computer program, storage media storing the computer program, and a computer when the functions described in the exemplary embodiment of the image processing apparatus of the invention and modified examples thereof are implemented in the computer program.

FIG. 19 is a schematic representation of examples of a computer program, storage media storing the computer program, and a computer when the functions described in the exemplary embodiment of the image processing apparatus of the invention and modified examples thereof are implemented in the computer program. In the figure, numeral 41 denotes a program, numeral 42 denotes a computer, numeral 51 denotes a magnetic optical disk, numeral 52 denotes an optical disk, numeral 53 denotes a magnetic disk, numeral 54 denotes memory, numeral 61 denotes a CPU, numeral 62 denotes internal memory, numeral 63 denotes a read section, numeral 64 denotes a hard disk, numeral 65 denotes an interface, and numeral 66 denotes a communication section.

All or some of the functions of the sections described in the exemplary embodiment of the image processing apparatus of the invention and modified examples thereof are implemented as the program 41 that can be executed by the computer. In the case, the program 41, data used in the program, etc., may be stored in a storage medium that can be read by the computer. The record medium is a medium for causing a change state of energy of magnetism, light, electricity, etc., in response to the description of a program for the read section 63 included in the hardware resources of the computer and transmitting the description of the program to the read section 63 in the form of a signal corresponding to the change state. For example, the media are the magnetic optical disk 51, the optical disk (containing a CO, a DVD, etc.), the magnetic disk, the memory (containing an IC card, a memory card, flash memory, etc.). Of course, the storage media are not limited to those of portable type.

The program 41 is stored in the storage media and, for example, the storage media are placed in the read section 63 or the interface 65 of the computer 42, whereby the program 41 is read from the computer, is stored in the internal memory 62 or the hard disk 64 (containing a magnetic disk, a silicon disk, etc.), and is executed by the CPU 61, whereby all or some of the functions described in the exemplary embodiment of the image processing apparatus of the invention and modified examples thereof are implemented. Alternatively, the program 41 is transferred through a communication channel to the computer 42, which then receives the program 41 in the communication section 66, stores the program 41 in the internal memory 62 or the hard disk 64, and executes the program 41 by the CPU 61, all or some of the functions may be implemented.

In addition, various devices may be connected to the computer 42 through the interface 65. For example, display section for displaying information, acceptance section for accepting information from the user, and the like may be connected. For example, an image reader for reading an image of a document may be connected through the interface 65 and an effective area may be set from the image read through the image reader. Further, the image forming apparatus may be connected through the interface 65 and the configuration shown in the exemplary embodiment of the image forming apparatus of the invention containing the function of the image creation section 33 may be implemented.

Of course, some of the functions can be implemented as hardware or all may be implemented as hardware. Alternatively, the functions may be implemented as a program containing all or some of the functions described in the exemplary embodiment of the image processing apparatus of the invention and modified examples thereof together with another configuration. The functions may be configured together with a program for implementing the function of the image creation section 33 shown in the exemplary embodiment of the image forming apparatus of the invention. Of course, to apply to another use, the function (program) may be integrated with the program in the use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a binarization section that binarizes a given image;
    a determination section that determines whether or not a pixel to be determined is effective in accordance with the number of pixels of one value of a binary value in each of determination areas,
    wherein each of the determination areas are placed so as not to contain the pixel to be determined in the binarized image and so as not to overlap in a predetermined direction of the pixel to be determined; and
    an area setting section that sets an area including the pixel determined effective in the determination section.

2. The image processing apparatus according to claim 1, wherein the determination section makes a comparison between the number of pixels of the one value in an area of a predetermined size with the pixel to be determined as the center and the number of pixels of the one value in each of the determination areas, and based on the comparisons, the determination section determines whether or not each of the determination areas is effective, and determines whether or not the pixel to be determined is effective in accordance with the determinations to the determination areas.

3. The image processing apparatus according to claim 1, further comprising:

a predetermination section that:

determines a pixel in the binarized image effective if said pixel has the one value, and if the number of pixels of the one value in a predetermined range from said pixel is larger than a predetermined first value;

determines a pixel in the binarized image ineffective if said pixel has the one value, and if the number of pixels of the one value in a predetermined range from said pixel is equal to or less than a predetermined second value being smaller than the predetermined first value or the pixel; and determines a pixel in the binarized image ineffective if said pixel does not have the one value, wherein the determination section does not adopt said pixel determined effective or ineffective by the predetermination section as the pixel to be determined, and the area setting section sets the area including the pixels determined effective by the predetermination section and the determination section.

4. The image processing apparatus according to claim 1, further comprising:

a reduction section that reduces the given image, wherein the binarization section binarizes the given image reduced by the reduction section.

5. The image processing apparatus according to claim 1, further comprising:

an inclination correction section that corrects inclination of the given image, wherein the binarization section binarizes the given image corrected by the inclination correction section.

6. An image forming apparatus comprising:

the image processing apparatus according to claim 1 that sets an effective area of the given image;

a forming section that forms an image on a medium; and an image creation section that cuts out the effective area set by the image processing apparatus from the given image and creates the image formed in the forming section.

7. An image processing method comprising:

binarizing a given image;

determining whether or not a pixel to be determined is effective in accordance with the number of pixels of one value of a binary value in each of determination areas, wherein each of the determination areas are placed so as not to contain the pixel to be determined in the binarized image and so as not to overlap in a predetermined direction of the pixel to be determined; and setting an area including the pixel determined effective.

8. A non-transitory computer readable medium storing a program causing a computer to execute a process for image processing, the process comprising:

binarizing a given image;

determining whether or not a pixel to be determined is effective in accordance with the number of pixels of one value of a binary value in each of determination areas, wherein each of the determination areas are placed so as not to contain the pixel to be determined in the binarized image and so as not to overlap in a predetermined direction of the pixel to be determined; and setting an area including the pixel determined effective.

* * * * *